(12) United States Patent
Brask

(10) Patent No.: US 7,545,341 B2
(45) Date of Patent: Jun. 9, 2009

(54) DOUBLE-SIDED ELECTRONIC DISPLAY

(75) Inventor: Kenneth Alan Brask, Lindenhurst, IL (US)

(73) Assignee: GFX International Inc., Grayslake, IL (US)

( * ) Notice: Subject to any disclaimer, the term of this patent is extended or adjusted under 35 U.S.C. 154(b) by 593 days.

(21) Appl. No.: 10/906,420

(22) Filed: Feb. 18, 2005

(65) Prior Publication Data
US 2006/0187140 A1    Aug. 24, 2006

(51) Int. Cl.
G09G 5/00    (2006.01)
(52) U.S. Cl. .......................... 345/1.1; 345/1.3; 361/681
(58) Field of Classification Search ........... 345/1.1–1.3, 345/102, 103, 903; 361/681
See application file for complete search history.

(56) References Cited

U.S. PATENT DOCUMENTS

| | | | |
|---|---|---|---|
| 4,243,986 A | | 1/1981 | Nixon |
| 4,973,951 A | * | 11/1990 | Shigeta et al. ................ 345/1.3 |
| 5,761,485 A | | 6/1998 | Munyan |
| 5,856,819 A | | 1/1999 | Vossler |
| 5,896,575 A | | 4/1999 | Higginbotham |
| 6,295,038 B1 | | 9/2001 | Rebeske |
| 6,466,292 B1 | | 10/2002 | Kim |
| 6,747,609 B2 | | 6/2004 | Antila et al. |
| 6,801,185 B2 | | 10/2004 | Salley |
| 6,819,309 B1 | * | 11/2004 | Kishi ........................... 345/87 |
| 6,967,632 B1 | * | 11/2005 | Minami et al. ................ 345/1.3 |
| 7,034,799 B2 | * | 4/2006 | Lee .............................. 345/102 |
| 2003/0067416 A1 | * | 4/2003 | Kim ........................... 345/1.1 |
| 2003/0076278 A1 | | 4/2003 | Choi |
| 2003/0115096 A1 | | 6/2003 | Reynolds et al. |
| 2005/0093767 A1 | * | 5/2005 | Lu et al. ....................... 345/1.1 |
| 2006/0119263 A1 | * | 6/2006 | Chen et al. ................... 313/512 |

OTHER PUBLICATIONS

Nguyen, Kimnhung, Notification of Transmittal of the International Search Report and the Written Opinion of the International Searching Authority, or the Declaration, PCT/US06/04915, second sheet, Oct. 24, 2007, International Searching Authority.

* cited by examiner

*Primary Examiner*—Richard Hjerpe
*Assistant Examiner*—Kimnhung Nguyen
(74) *Attorney, Agent, or Firm*—Vedder Price P.C.

(57) ABSTRACT

An electronic display includes a first display, a second display and an enclosure that is adapted to house the first display and the second display such that the back side of the first display faces the back side of the second display. The enclosure includes a first side wall, a second side wall, and a perimeter wall. At least one support circuit disposed between the back side of the first display and the back side of the second display is operatively coupled to each of the first display and the second display. The thickness of the enclosure is substantially defined by a thickness of the first side wall, the thickness of the first display, the thickness of the second display, the thickness of the support circuit, and a thickness of the second side wall when the first display, the second display, and the support circuit are housed in the enclosure.

17 Claims, 2 Drawing Sheets

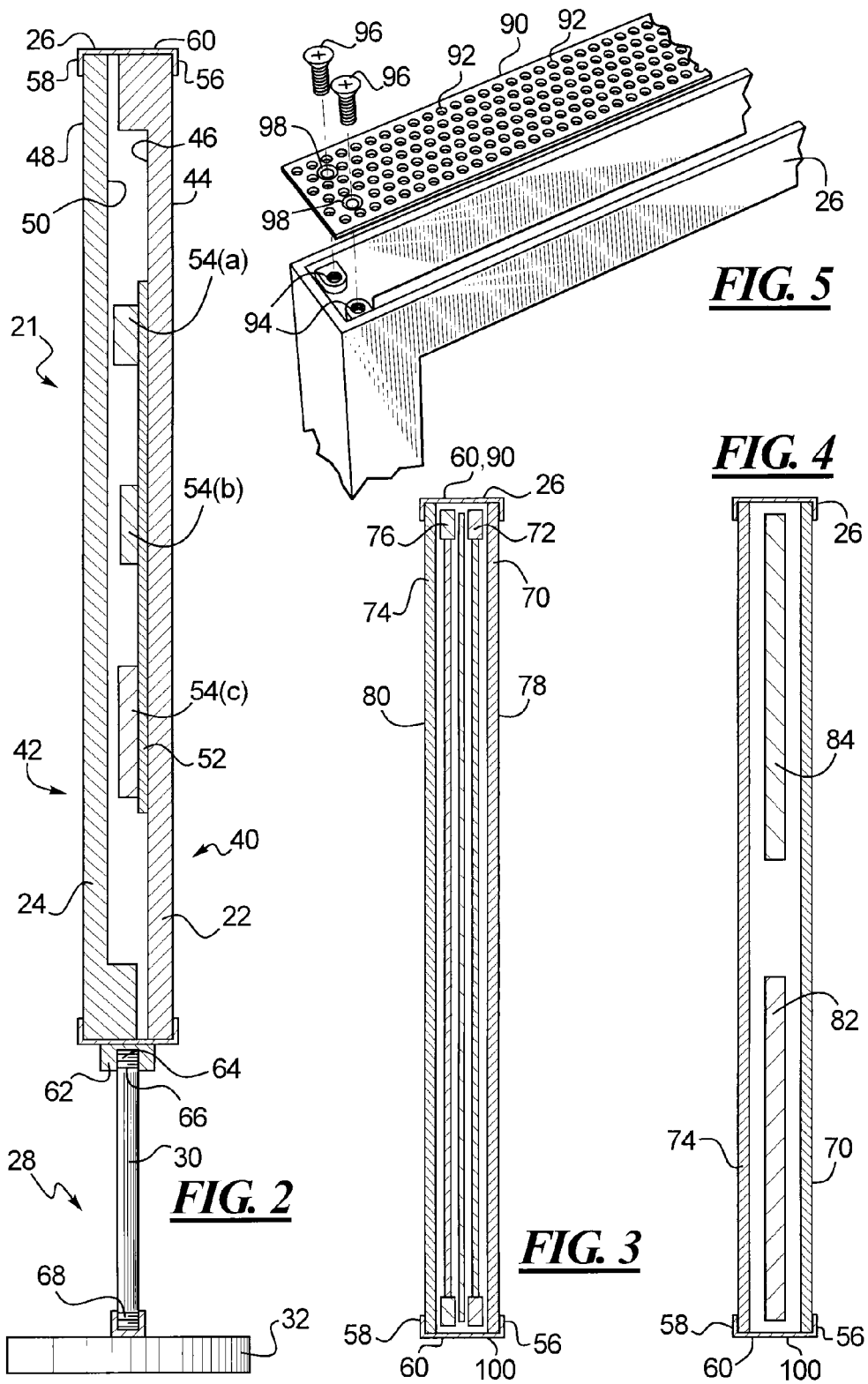

DOUBLE-SIDED ELECTRONIC DISPLAY

FIELD OF THE DISCLOSURE

The present disclosure relates to electronic displays, and more particularly, to a double-sided electronic display.

BACKGROUND

Electronic displays, such as LCD monitors, plasma displays, or the like are typically used in retail environments to provide visual information to persons that may be in the visual proximity of such displays. The visual information displayed may be advertisements, product information, or various promotional sales information. The use of such thin profile displays rather than thicker profile displays, such as CRT displays, may be necessitated by the limited space available in a retail environment. Additionally, such thin profile displays are relatively light. Accordingly, they can be easily moved in a retail environment and mounted to a wall, ceiling or a stand.

When viewers are located at different locations in a retail environment, several displays may be needed to provide visual information to all viewers. Typically, however, two back-to-back positioned displays can cover a full 360° viewing area, particularly if the viewing angle of each display is relatively large. Each display can include a power supply having a power cable that supplies power to the display. Additionally, each display may mounted to a support structure in the position desired. One or more sources of visual data, such as a computer, can provide visual data to each display through each display's video input cable. Therefore, each display may be independently mounted, powered, and provided with visual data.

The above-described display system cannot be easily moved in a retail environment in which it is used. For example, moving each display involves moving its associated support structure, power supply, and other equipment. Because the displays are structurally and operationally independent, mounting them in a back-to-back configuration with their associated equipment may consume a large space in the retail environment, which may defeat the purpose of using such low profile displays. Furthermore, because a source of visual data is also provided near the displays to provide visual data to the displays, three power outlets may be required near the display system to power the source of visual data and the two displays.

Therefore, there exists a need for a double display system that has a thin profile so as to occupy a small space, can be easily mounted to a variety of support structures, and includes component that share power, visual resources and space resources.

SUMMARY

In accordance with one principal aspect of the present disclosure, an electronic display comprises a first display having a display side, a back side, and a thickness, and a second display having a display side, a back side, and a thickness. An enclosure houses the first display and the second display such that the back side of the first display faces the back side of the second display. The enclosure includes a first side wall having a first opening configured to provide viewing of the display side of the first display, a second side wall having a second opening configured to provide viewing of the display side of the second display, and a perimeter wall joining the first side wall and the second side wall. The electronic display further comprises at least one support circuit disposed between the back side of the first display and the back side of the second display. The support circuit has a thickness and is operatively coupled to each of the first display and the second display. The thickness of the enclosure is substantially defined by a thickness of the first side wall, the thickness of the first display, the thickness of the second display, the thickness of the support circuit, and a thickness of the second side wall when the first display, the second display, and the support circuit are housed in the enclosure.

In accordance with another principal aspect of the present disclosure, an electronic display system comprises a source of visual data having a visual data output port and at least one visual data input port operatively coupled to the output port of the source. The electronic display system further comprises a first display assembly having a display side and a back side, the first display assembly being operatively coupled to the at least one visual data input port, and a second display assembly having a display side and a back side, the second display assembly being operatively coupled to the at least one visual data input port. A power supply operatively coupled to the first display assembly and the second display assembly powers the first display assembly and the second display assembly. Also, an enclosure houses the first display assembly and the second display assembly such that the back side of the first display assembly faces the back side of the second display assembly. The enclosure comprises a first side wall having a first opening configured to provide viewing of the display side of the first display assembly, a second side wall having a second opening configured to provide viewing of the display side of the second display assembly, a perimeter wall joining the first side wall and the second side wall. The electronic display system further comprises at least one connection member coupled to the enclosure to connect the enclosure to a support structure.

In accordance with another principal aspect of the present disclosure, a dual-display system comprises a first display having a display side and a back side, and a second display having a display side and a back side the backside of the first display faces the backside of the second display. At least one support circuit is operatively coupled to each of the first display and the second display and is disposed between the back side of the first display and the backside of the second display. Additionally, a thickness of the support circuit substantially defines a gap between the backside of the first display and the backside of the second display.

BRIEF DESCRIPTION OF THE DRAWINGS

Certain embodiments are shown in the drawings. However, it is understood that the present disclosure is not limited to the arrangements and instrumentality shown in the attached drawings, wherein:

FIG. 2 is a side cross sectional view of a double-sided electronic display constructed in accordance with the teachings of the present disclosure.

FIG. 3 is a side cross sectional view of a portion of a double-sided electronic display constructed in accordance with the teachings of one aspect of the present disclosure.

FIG. 4 is a side cross sectional view of a portion of a double-sided electronic display constructed in accordance with the teachings of another aspect of the present disclosure.

FIG. 5 is an exploded perspective view of an upper portion of an enclosure housing a double-sided electronic display constructed in accordance with the teachings of the present disclosure.

DETAILED DESCRIPTION

Figure 1:
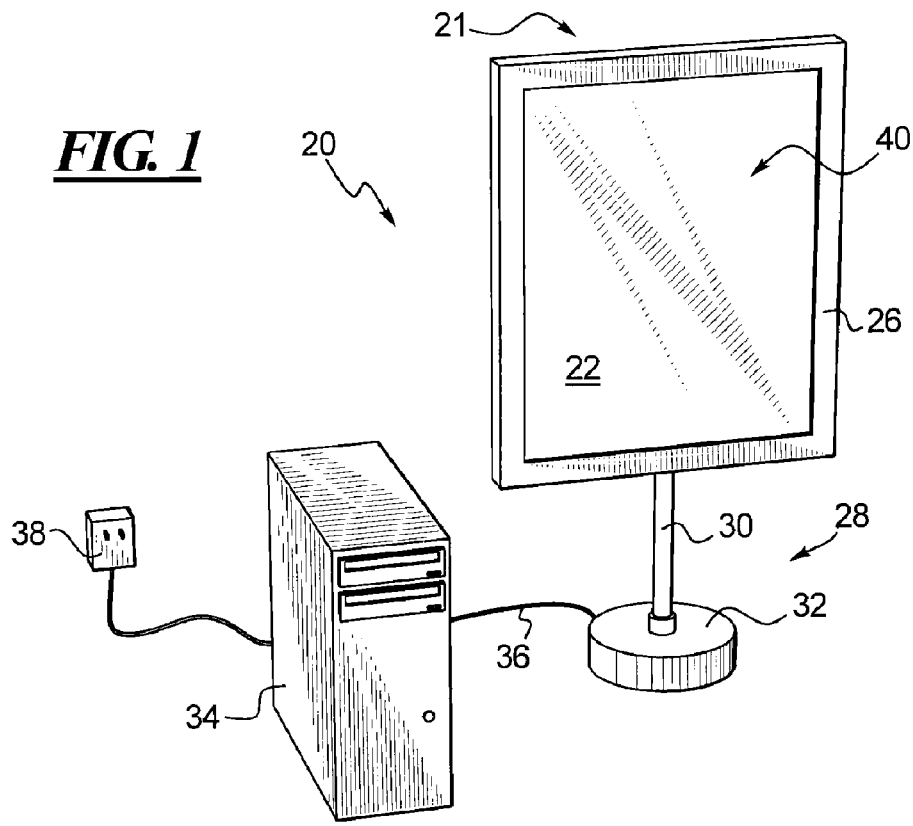
FIG. 1 is a perspective view of a double-sided electronic display system constructed in accordance with the teachings of the present disclosure.

For the purposes of promoting and understanding the principles disclosed herein, reference will now be made to the preferred embodiments illustrated in the drawings and specific language will be used to describe the same. It will nevertheless be understood that no limitation of the scope is thereby intended. Such alterations and further modifications in the illustrated device and such further applications are the principles disclosed as illustrated therein as being contemplated as would normally occur to one skilled in the art to which this disclosure relates.

Referring to FIG. 1, a double-sided electronic display system 20 constructed in accordance with the teachings of the present disclosure is shown. The electronic display system 20 includes an electronic display 21, a support structure 28, and a source of visual data 34. The electronic display 21 includes a first display 22 and a second display 24, both of which are housed in an enclosure 26. The enclosure 26 may be mounted to the support structure 28, which is shown in FIG. 1 to include a stand 30 and a base 32.

The first display 22 and the second display 24 are operatively coupled to the source of visual data 34, which is shown to be a computing device 34 in FIG. 1 and may be referred to herein as such, by a power and data cable 36. The computing device 34 may provide visual data and power to the first display 22 and the second display 24 through the power and data cable 36. The electronic display system 20 also includes a power supply 38 that provides power to the electronic display 21 and the computing device 34.

The enclosure 26 includes a first opening 40 that allows viewing of the first display 22 and a second opening 42 that allows viewing of the second display 24. When the electronic display system 20 is operational, the first display 22 and the second display 24 can display visual data on both sides of the electronic display system 20. Accordingly, viewers on both sides of the electronic display system 20 or viewers who are passing by the electronic display system 20 can view the visual data from a variety of angles and directions.

Referring to FIG. 2, a cross-section of the electronic display 21 constructed in accordance with the teachings of the present disclosure is shown. The first display 22 includes a display side 44 and a back side 46. Similarly, the second display 24 includes a display side 48 and a back side 50. Enclosure 26 houses the first display 22 and the second display 24 such that the back side 46 and the back side 50 face each other. The electronic display 21 may include one or more support circuits 52 (only one support circuit shown in FIG. 2), that control the operation of the first display 22 and the second display 24. The support circuit 52 is disposed between the back side 46 of the first display 22 and the back side 50 of the second display 24.

In FIG. 2, several exemplary circuit elements 54(a)-(c) are shown. The space between the back side 46 of the first display 22 and the back side 50 of the second display 24 may be slightly wider than the height of the support circuit 52 at the location of the largest circuit element 54(a) of the support circuit 52. The enclosure 26 includes a first side wall 56 and a second side wall 58, each of which have a thickness. Therefore, the width of the enclosure 26 is substantially defined by the combined widths of the first side wall 56, the first display 22, the support circuit 54, the second display 24, and the second side wall 58. Slight gaps may exist between the noted elements of the electronic display 21, such as any gap between the circuit element 54A and the second display 24 as shown in FIG. 2. The gaps, however, may be kept to a minimum to provide a thin enclosure 26. Additionally, the electronic display 21 may include a number of standoffs (not shown) that provide slight gaps between the above-described components of the electronic display 21. The standoffs may, for example, keep the above-noted components slightly separated to provide air flow therein for cooling the first display 22, the second display 24 and the support circuit 52.

The enclosure 26 includes a perimeter wall 60 that is disposed between the first side wall 56 and the second side wall 58 of the enclosure 26. The perimeter wall 60 may include a stand connector 62 which can receive the stand 30. The stand connector 62 includes a centrally disposed threaded bore 64 that can receive a correspondingly threaded end 66 of the stand 30. Stand 30 includes a second threaded end 68 for connection of the stand 30 to the base 32. Accordingly, the enclosure 26 can be supported by the stand 30 and the base 32 as shown in FIG. 2 in an upright manner.

The support structure 28, as shown in FIG. 2, is one of numerous methods by which the enclosure 26 can be supported during the operation of the electronic display 21. For example, the perimeter wall 60 may include tabs (not shown) that can be used to suspend the enclosure 26 from cables that may be mounted to a ceiling. Accordingly, the enclosure 26 can be suspended at the eye level of viewers so that both sides of the electronic display, i.e., first display 22 and the second display 24, can be viewed by the viewers. In yet another example, the perimeter wall 60 may include two side connectors (not shown) that can be used to mount the enclosure 26 to a wall bracket (now shown). Therefore, the electronic display 21 can be mounted on a wall at a perpendicular orientation relative to the wall such that viewers positioned on both sides of the electronic display can view the first display 22 and/or the second display 24, respectively.

The first display 22 and the second display 24 may be any type of electronic display that is used to display visual information. For example, the first display 22 and the second display 24 can be LCD monitors, plasma displays, or any other type of low profile display. Referring to FIG. 3, an exploded cross-sectional view of the electronic display 21 is shown having two LCD monitors. As is known to those of ordinary skill in the art, typical LCD monitors include backlighting so as to provide an uniformly bright display to a viewer. However, some LCD monitors may not optionally include backlighting. The first display 22 and the second display 24 shown in FIG. 3 are LCD displays that include backlighting. Accordingly, the first display 22 includes a display layer 70 and a backlight 72, and the second display 24 includes a display layer 74 and a backlight 76.

Disposed between the backlight 72 and the backlight 76 is the support circuit 52. In FIG. 3, the support circuit 52 is shown as a contiguous circuit. However, as will be described with reference to FIG. 4, the support circuit 52 could include two or more support circuits 52 that provide display support for the first display 22 and the second display 24. To protect the outer surfaces of the display layer 70 and the display layer 74. The first display 22 can include a protective layer 78 disposed on the display layer 70. Similarly, the second display 24 can include a protective layer 80 disposed on the display layer 74. Accordingly, a viewer who touches the display layer 70 will only contact the protective layer 78. Similarly, a viewer who touches the display layer 74 will only contact the protective layer 80. Additionally, the protective layers 78 and 80 can be rigid and of a desired thickness to protect the display layers 70 and 74, respectively, from sharp objects that may be pressed thereon or strike the outer surfaces thereof.

Slight gaps may exist between the noted elements of the electronic display 21 of FIG. 3. The gaps, however, may be kept to a minimum to provide a thin enclosure 26. Additionally, the electronic display 21 of FIG. 3 may include a number of standoffs (not shown) that provide slight gaps between the above-described components of the electronic display 21. The standoffs may, for example, keep the above-noted components slightly separated to provide air flow therein for cooling the first display 22, the second display 24 and the support circuit 52.

Referring to FIG. 4, an exploded cross-sectional view of another example of the electronic display 21 is shown. The first display 22 and the second display 24 of FIG. 4 are shown without backlighting. Accordingly, the first display 22 and the second display 24 of FIG. 4 can either be LCD monitors without backlighting, a plasma displays, or other low profile displays. Additionally as shown in FIG. 4, the support circuit 52 is not contiguous. The support circuit 52 of FIG. 4 includes a first support circuit 82 and a second support circuit 84. The first support circuit 82 may include the electronics that control the operation of the first display 22 and the second support circuit 84 may include electronics that control the operation of the second display 24. Although the first support circuit 82 and the second support circuit 84 are shown to be independent, the two support circuits 82 and 84 can be connected by leads, cables or wires.

Slight gaps may exist between the noted elements of the electronic display 21 of FIG. 4. The gaps, however, may be kept to a minimum to provide a thin enclosure 26. Additionally, the electronic display 21 of FIG. 4, may include a number of standoffs (not shown) that provide slight gaps between the above-described components of the electronic display 21. The standoffs may, for example, keep the above-noted components slightly separated to provide air flow therein for cooling the first display 22, the second display 24 and the support circuits 82 and 84.

The electronic display 21 may include one or more air inlets and one or more air outlets in the enclosure 26 to provide for dissipation of heat from the first display 22, the second display 22 and the support circuit 52 through convection. Referring to FIG. 5, the perimeter wall 60 may include a ventilated top portion 90 that includes a plurality of perforations or vent holes 92 for allowing the warm air that may be inside the enclosure 26 to diffuse outward. The enclosure 26 may include a number of mounting tabs 94 that align with a corresponding number of apertures 98 when the top perimeter wall 90 is placed on top of the enclosure 26. The top perimeter wall 90 can then be attached to the enclosure 26 by a number of fasteners 96. The fasteners 96 preferably have a flat head or low profile head so as to be flush with the top perimeter wall 90 when fully fastened. Alternately, the apertures 98 may include recesses to house the heads of the fasteners 96 to provide a flush surface on the top perimeter wall 90 when the fasteners fully fastened. The perforations 92 may be drilled holes, slots or various apertures that can provide diffusion of the air from inside the enclosure 26.

Figure 6:
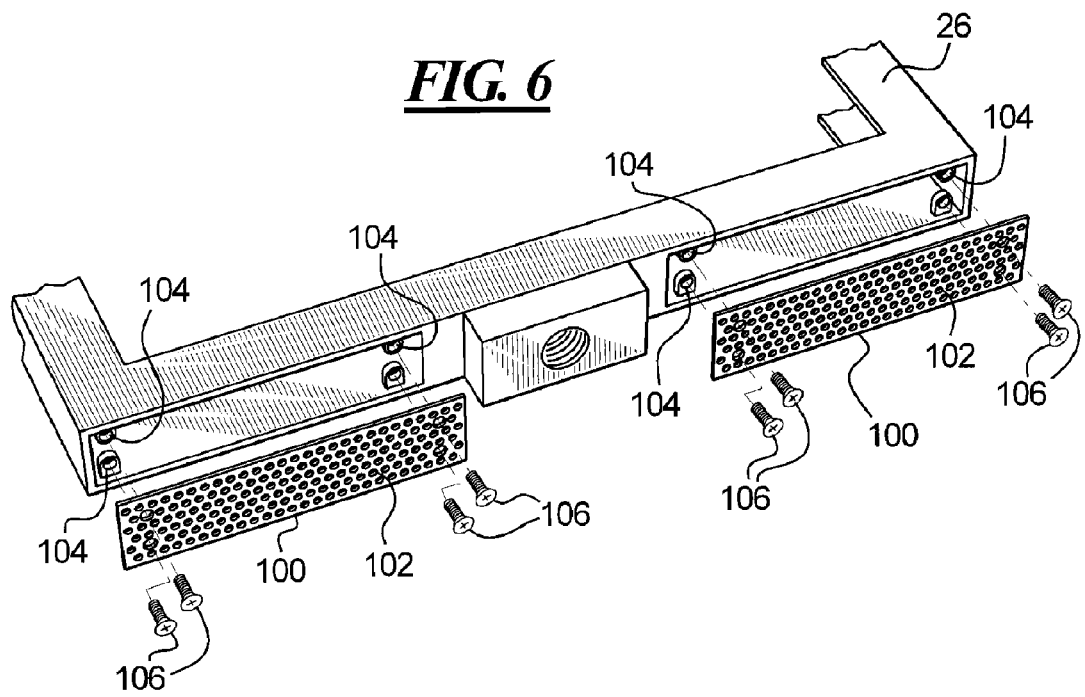
FIG. 6 is an exploded perspective view of a lower portion of an enclosure housing a double-sided electronic display constructed in accordance with the teachings of the present disclosure.

Referring to FIG. 6, the perimeter wall 60 may include one or more bottom perimeter wall portions 100, which can include a plurality of perforations or vent holes 102. Similar to the above-described method of attaching the top perimeter wall 90 to the enclosure 26, the bottom perimeter walls 100 are attached to the enclosure with fasteners 106 that engage mounting tabs 104 to fasten the bottom perimeter walls 100 to the enclosure 26. The fasteners 106 are identical or in many ways similar to the fasteners 96, in that, they either include a flat heads or a low profile heads so as to provide a flush surface on the bottom perimeter walls 100 when fully fastened. The vent holes 102 of the bottom perimeter wall portions 100 may be drilled holes, slots or the like. When the electronic display 21 is mounted on the stand 30 in the upright position shown in FIGS. 1 and 2, outside air can enter the enclosure 26 through the vent holes 102 of the bottom perimeter walls 100 and move through the enclosure 26. The air then absorbs the heat generated by the first display 22, the second display 24, and the support circuit 52 through convection. The air then exits from the vent holes 92 of the top perimeter wall portion 92. Accordingly, the air moving through the enclosure 26 can cool the various components of the first display 22, the second display 24 and the support circuit 52.

The electronic display system 20 can be used in any environment where the use of a dual display system is desired. For example, the electronic display system 20 can be used in a classroom setting, in retail environments, or even in outdoor environments. The construction materials of the support structure 28 and the enclosure 26 may dictate the environment of use of the electronic display system. For example, in a classroom setting where the electronic display system 20 is not exposed to heavy viewer traffic, or remains stationary during most of its operation, the enclosure 26 and the support structure 28 may be constructed from plastics or lightweight materials. When the electronic display system 20 is used in a retail environment, such as in a store to provide viewers with information or advertisements, or when the electronic display 21 is susceptible to damage repeated contact by viewers, the enclosure 26 and the support structure 28 can be constructed from metal. Additionally, in such retail environments, the electronic display 21 may be moved occasionally to display various information thereon. Accordingly, the electronic display 20 may be susceptible to contact with other objects that can damage the outside of the enclosure 26. Therefore, by constructing the enclosure 26 out of metal, such damage may be prevented or may be visually unnoticeable if it occurs.

As described in the foregoing, the source of visual data 34 may be a computing device 34 as shown in FIG. 1. However, one of ordinary skill in the art will readily appreciate that the source of visual data 34 may be a video tape player, a digital video player, or any other type of electronic device that can send visual data through the power and data cable 36 to the first display 22 and the second display 24. The electronic display 21 receives power through the power and data cable 36. In the disclosed example, the electronic display 21 uses DC power, which may be either provided by a power supply 38 that also powers the source of visual data 34. Although the power supply is shown in FIG. 1 to be external to the source of visual data 34, the power supply may be housed inside the source of visual data 34, as may be generally the case for desktop computers, for example. Accordingly, the internal power supply (not shown) of a computing device 34 can be used to supply power to the electronic display 21 through the power and data cable 36. Therefore, the electronic display 21 can receive both power and visual data from the source of visual data 34. The electronic display 21 may also include at least one speaker (not shown) that can receive audio data from the computing device 34. The audio data typically may accompany the visual data and may be transmitted to the electronic display 21 by the power and data cable 36.

The electronic display 21 may be assembled by using two separate previously assembled electronic displays. The assembly can include removing the components of the electronic display, and reassembling the components in the enclosure 26. For example, the electronic display 21 can be constructed by taking two similarly sized LCD monitors, removing the display layer and the backlight therefrom, and assembling the first display and the second display inside the enclosure 26 with the associated support circuits disposed therebetween. Accordingly, the electronic display 21 can be constructed by disassembling two previously assembled displays and repackaging it in the enclosure 26 so as to provide the disclosed double-sided display, the thickness of which may be less than the thickness of the previously removed displays added together. Alternatively, the electronic display 21 can be manufactured with various display components. Therefore, a manufacturer of the electronic display 21 can either use the enclosure 26 to assemble two disassembled displays 22 and 24 and their associated support circuits 52, or construct the electronic display 21 by assembling originally separate components that are necessary to provide the electronic display 21.

Furthermore, while the particular preferred embodiments have been shown and described, it will be obvious to those skilled in the art that changes and modifications may be made without departing from the teaching of the disclosure. The matter set forth in the foregoing description and accompanying drawings is offered by way of illustration only and not as limitation. The actual scope of the disclosure is intended to be defined in the following claims when viewed in their proper perspective based on the related art.

What is claimed is:

1. An electronic display system comprising:
    a source of visual data having a visual data output port;
    at least one visual data input port operatively coupled to the output port of the source;
    a first display assembly having a display side and a back side, the first display assembly being operatively coupled to the at least one visual data input port;
    a second display assembly having a display side and a back side, the second display assembly being operatively coupled to the at least one visual data input port;
    wherein at least one of the first side wall, the second side wall, and the perimeter wall of the enclosure include ventilation ports to cool the first display, the second display, and the support circuit;
    a power supply operatively coupled to the first display assembly, the second display assembly and the source of visual data;
    an enclosure adapted to house the first display assembly and the second display assembly such that the back side of the first display assembly faces the back side of the second display assembly, the enclosure comprising a first side wall having a first opening configured to provide viewing of the display side of the first display assembly, a second side wall having a second opening configured to provide viewing of the display side of the second display assembly, a perimeter wall joining the first side wall and the second side wall; and
    at least one connection member coupled to the enclosure to connect the enclosure to a support structure.

2. The electronic display system of claim 1, wherein the at least one connection member is fixedly attached to the enclosure, and includes a threaded bore.

3. The electronic display system of claim 1, wherein the power supply is a DC power supply.

4. The electronic display system of claim 1, each of the first display assembly and the second display assembly comprising a display layer, a backlight and a support circuit.

5. The electronic display system of claim 4, wherein the support circuit of the first display assembly and the support circuit of the first display assembly are defined by a display system support circuit disposed in the housing.

6. The electronic display system of claim 5, wherein the first display assembly, the second display assembly and the display system support circuit are contiguous.

7. The electronic display system of claim 1, further comprising a standoff between the first display and the second display, wherein a thickness of the enclosure is substantially defined by a thickness of the first side wall, a thickness of the first display assembly, a thickness of the second display assembly, the thickness of the standoff, and a thickness of the second side wall.

8. The electronic display system of claim 1, wherein the source of visual data is a computing device.

9. The electronic display system of claim 1, further comprising at least a speaker housed in the enclosure, the speaker being operatively coupled to an audio output port of the source of visual data to receive audio data from the source of visual data.

10. The electronic display system of claim 1, further comprising a first protective layer disposed over the display side of the first display assembly and a second protective layer disposed over the display side of the second display assembly.

11. The electronic display system of claim 1, wherein at least one of the first side wall, the second side wall, and the perimeter wall of the enclosure include ventilation ports to cool the first display assembly and the second display assembly.

12. A dual-display system comprising:
    a first display having a display side and a back side, wherein the top portion of the first display as a first thickness and the bottom portion of the first display has a second thickness;
    a second display having a display side and a back side, wherein the top portion of the second display has a second thickness and the bottom portion of the second display has a first thickness, and wherein the second thickness is inferior than the first thickness for both the first display and the second display forming an opening between the first and second display;
    at least one support circuit operatively coupled to each of the first display and the second display in the opening between the first and second display;
    wherein the backside of the first display faces the backside of the second display;
    wherein the support circuit is disposed between the back side of the first display and the backside of the second display;
    wherein a thickness of the support circuit substantially defines a gap between the backside of the first display and the backside of the second display; and
    wherein the support circuit comprises a first support circuit operatively coupled to the first display and a second support circuit operatively coupled to the second display.

13. The dual-display system of claim 12, further comprising an enclosure housing the first display, the second display, and the support circuit.

14. The dual-display system of claim 12, wherein each of the first display and the second display includes a display layer and a backlight.

15. The dual-display system of claim 12, further comprising a power input port operatively coupled to the first display, the second display, and the support circuit, the power input port coupled to an external power supply.

16. The dual-display system of claim 12, further comprising a first protective layer disposed over the display side of the first display and a second protective layer disposed over the display side of the second display.

17. The dual-display system of claim 12, wherein the first display, the second display, and the support circuit are contiguous.

* * * * *